United States Patent [19]

Takanashi et al.

[11] Patent Number: 5,565,882
[45] Date of Patent: Oct. 15, 1996

[54] IMAGE PROCESSING SYSTEM FOR DISPLAY, RECORDING AND REPRODUCING IMAGE

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 401,331

[22] Filed: Mar. 9, 1995

Related U.S. Application Data

[63] Continuation of Ser. No. 857,561, Mar. 25, 1992, abandoned.

[30] Foreign Application Priority Data

Mar. 26, 1991 [JP] Japan ................................ 3-087558

[51] Int. Cl.$^6$ .............................. G09G 3/00; H04N 5/64
[52] U.S. Cl. .......................... 345/32; 348/744; 348/750
[58] Field of Search .................................. 348/744, 750, 348/751, 758; 358/335, 342; 345/32, 87, 9, 207

[56] References Cited

U.S. PATENT DOCUMENTS

| | | |
|---|---|---|
| 3,128,458 | 4/1964 | Romero . |
| 4,727,418 | 2/1988 | Kato et al. ................ 348/74 |
| 4,807,978 | 2/1989 | Grinberg et al. ............ 348/40 |
| 4,818,983 | 4/1989 | Hara et al. ............... 345/207 |
| 4,831,452 | 5/1989 | Takanashi et al. .......... 348/265 |
| 4,843,632 | 6/1989 | Lee et al. . |
| 5,047,858 | 9/1991 | Aimonoya ................ 358/183 |
| 5,117,468 | 5/1992 | Hino et al. ............... 382/41 |
| 5,235,437 | 8/1993 | Katagiri et al. ............ 348/761 |
| 5,255,100 | 10/1993 | Urbanus ................ 348/744 |
| 5,260,797 | 11/1993 | Muraji et al. ............ 348/751 |

FOREIGN PATENT DOCUMENTS

| | | |
|---|---|---|
| 530760 | 10/1993 | European Pat. Off. . |
| 2570537 | 3/1986 | France . |
| 2619982 | 3/1989 | France . |
| 3837313 | 5/1989 | Germany . |
| 59-45787 | 3/1984 | Japan ................ 358/183 |
| 62-131677 | 6/1987 | Japan ................... 5/740 |
| 3-53289 | 3/1991 | Japan . |
| 3-54540 | 3/1991 | Japan . |
| 2176042 | 12/1986 | United Kingdom . |

OTHER PUBLICATIONS

"Electronics on Broadway" Electronics, Sep. 1937.

*Primary Examiner*—Richard Hjerpe
*Assistant Examiner*—Amare Mengistu
*Attorney, Agent, or Firm*—Lowe, Price, LeBlanc & Becker

[57] ABSTRACT

An image processing system for an image display comprising an image data producing device for producing image data corresponding to an image to be displayed and a display device for displaying the image on the basis of the produced image data. The image data producing device divides the image data into a plurality of data sections respectively corresponding to image areas constituting the image so that each of the plurality of data sections is produced as serial data and the plurality of data sections are outputted in parallel. The display device includes a number of pixel elements continuously arranged one-dimensionally or two-dimensionally and equally divided into a plurality of element sections respectively corresponding to the plurality of data sections. The display device is responsive to the image data from the image data producing device so that the plurality of data sections are inputted in parallel to the plurality of element sections, whereby the display device displays the image on a screen on the basis of the plurality of inputted data sections. This arrangement can speedily display a jointless high-grade image in real time.

2 Claims, 7 Drawing Sheets

IMAGE PROCESSING SYSTEM FOR DISPLAY, RECORDING AND REPRODUCING IMAGE

This application is a continuation of application Ser. No. 07/857,561 filed Mar. 25, 1992 now abandoned.

BACKGROUND OF THE INVENTION

The present invention relates generally to image processing systems, and more particularly to such image processing systems for displaying, recording and reproducing a high-grade image such as HDTV and 35-mm picture film.

As a system for treating a high-grade and high-resolution image there is known a display apparatus such as a 35-mm or 70-mm picture projector. For the treatment-facilitating purposes and picture-deterioration preventing purposes, for such a display apparatus there is developed a device for reading an image on a film to convert the film picture into an image signal such as a HDTV to record it in a digital VTR (video tape recorder).

Figure 10:
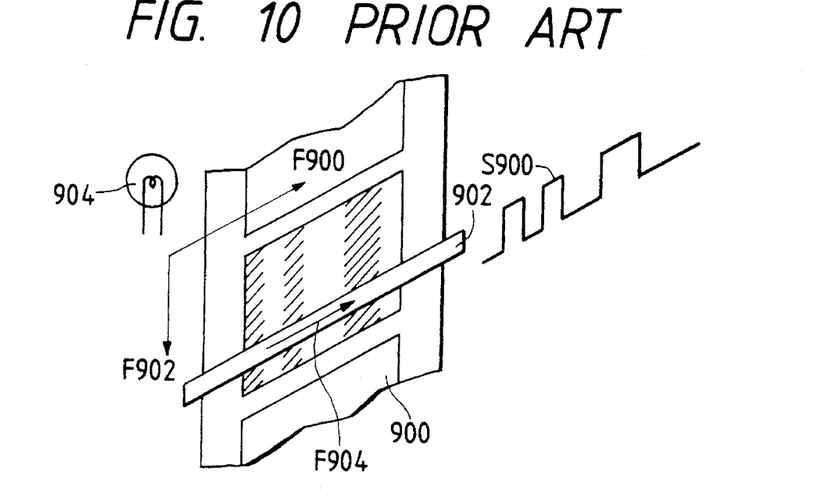
FIGS. 10 to 12 are illustrations for describing arrangements of conventional image processing systems.

FIG. 10 is an illustration of one example of conventional image-reading techniques of the types of scanning a line sensor with light to read a film picture. In FIG. 10, designated at numeral 902 is a line sensor disposed at one side of a film 900 to be elongated in a main scanning direction F900 of the film 900 and denoted at numeral 904 is a light source disposed at the other side of the film 900 to be opposed relation to the line sensor 902 with the film 900 being interposed therebetween. The film 900 is illuminated with light emitted from the light source 904 and, at the same time, moved in a secondary scanning direction F902 perpendicular to the main scanning direction F900, whereby the image information of the film 900 can be read out by means of the transmission light from the light source 904 to the line sensor 902. The line sensor 902 photoelectrically converts the incident transmission light into electric charges. Then, the charges in the line sensor 902 are successively shifted in a direction F904 (the main scanning direction F900), thus obtaining a signal having a waveform as illustrated at numeral S900. This operation is effected in conjunction with movement of the film 900 in the secondary scanning direction F902 and hence the film image can entirely be converted as an image signal into an electric signal.

Figure 11:
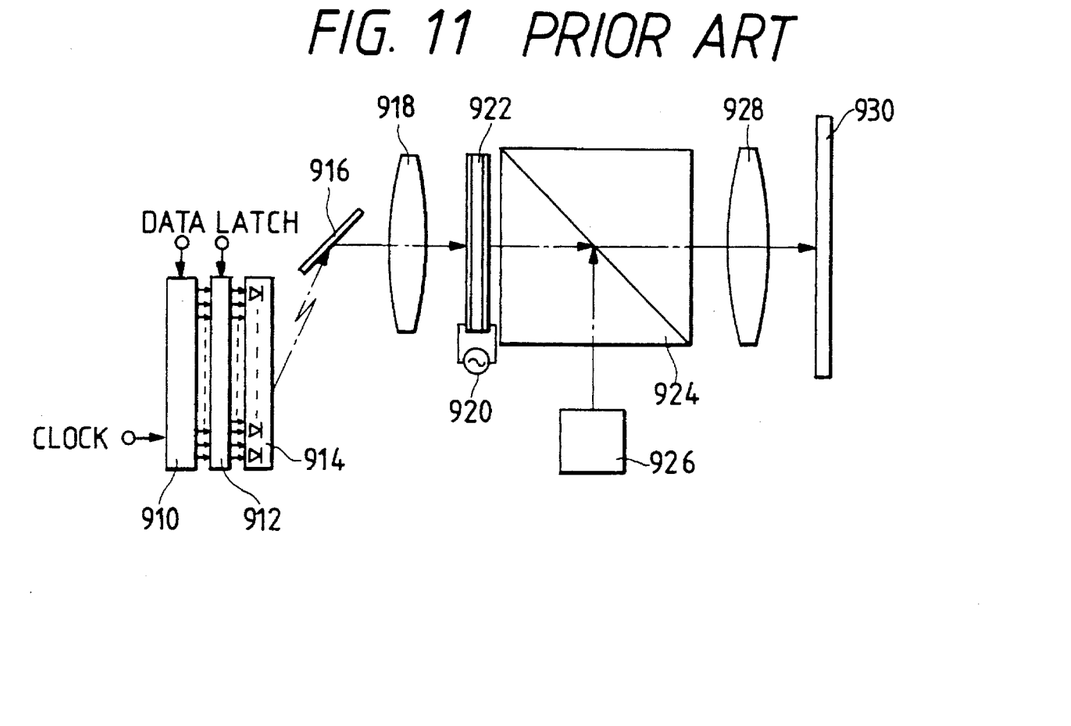

Secondly, a description will be made hereinbelow in terms of one example of conventional reproducing techniques for reproducing the image converted into the image signal. FIG. 11 shows a conventional reproducing technique of the type of using a linearly (one-dimensionally) arranged light-emitting elements. In FIG. 11, designated at numeral 910 is a shift register responsive to a clock signal and an image data signal corresponding to the film picture. The image data for one line is latched by a latch circuit 912 at the timing of a latch signal, whereby an LED (light-emitting diode) array 914 is driven in correspondence with the latched image data. Light emitted from the LED array 914 is incident through a scanning galvanomirror 916 and a writing lens 918 on a spatial light modulator 922, thereby writing the image data for one line. Here, the spatial light modulator comprises an optical conductive layer and a light modulating layer, the optical conductive layer having a conductive characteristic variable in accordance with information-writing light so as to apply an electric field corresponding to the intensity distribution of the writing light to the light modulating layer to thereby modulate reading light incident on the light modulating layer. If repeatedly performing this writing operation with the galvanomirror 916 being rotated, the image information for one screen can be written therein. This image information is wholly read out by reading light incident from a reading light source 926 through a polarization beam splitter 924 on the spatial light modulator 922 and then projected through a projecting lens 928 onto a screen 930.

Figure 12:
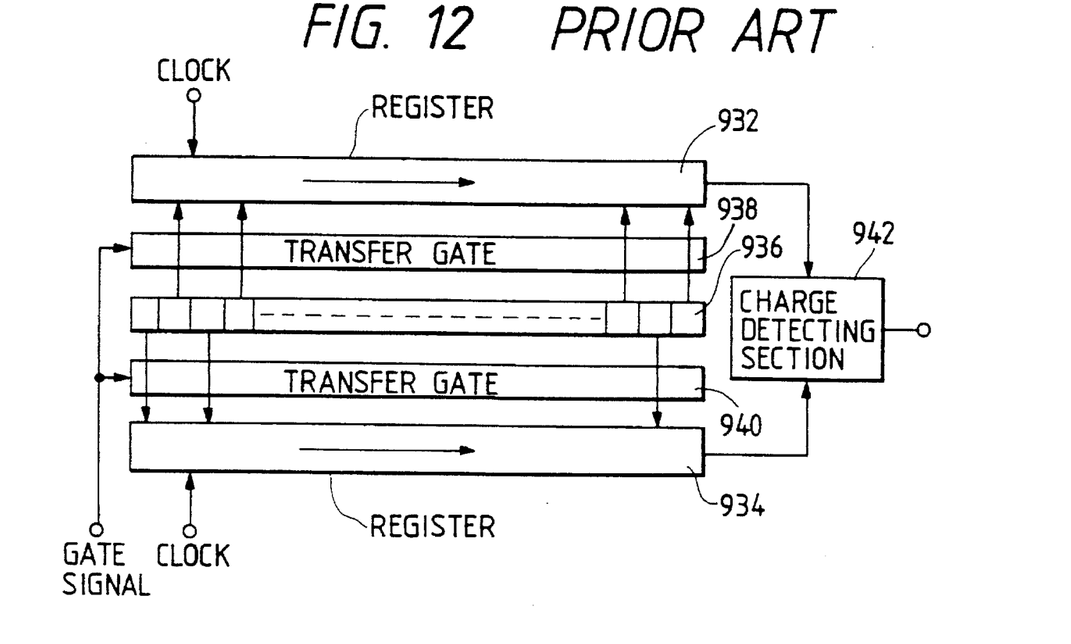

However, such conventional techniques can arise the following problems. That is, in the case of the image reading based on the line sensor, since the electric signal due to the photoelectric conversion is arranged to be successively transferred and outputted in the direction F904, the image reading speed is restricted by the signal transferring speed. While the transfer clock frequency for the register of the line sensor is generally several MHz to several 10 MHz, as a result it becomes impossible to read and output the image such as 35-mm or 70-mm film motion picture with a high resolution in real time. For eliminating this problem, two rows of registers 932 and 934 are provided as illustrated in FIG. 12 so that the photoelectric conversion signals of the odd-number elements of a line sensor 936 are transferred to the register 932 through a transfer gate 938 to which is inputted a gate signal indicative of the operation timing and the photoelectric conversion signals of the even-number elements of the line sensor 936 are transferred to through another transfer gate 940 to the register 934. The respective photoelectric conversion signals transferred to the registers 932 and 934 are outputted through a signal charge detecting section 942. However, this system can arise a disadvantage in efficient coding operations such as compression and expansion because the image data exist at random. Thus, the image data are required to be once converted into the serial data for processing and hence difficulty is encountered to perform the processing at a high speed. Such a disadvantage similarly occurs in the case of the image writing due to the LED array. That is, the transfer clock frequency of the shift register 910 is actually about 10 MHz, and therefore, when treating the image data corresponding to 4000 pixels in the horizontal direction, the time required for transferring the image data up to the end of the register becomes about 0.4 ms. In addition, if one screen corresponds to 2300 lines, the time taken for writing the image data for one screen becomes 920 ms, thereby making it difficult to treat a motion picture. Particularly, in the case of processing and recording or reproducing an image such as a 70-mm film picture with a high resolution, the aforementioned serial data conversion causes the high-speed processing to become more difficult so as not to allow the real-time processing.

On the other hand, the compression processing and the like becomes weighty for the recording and transmission of the image data in accordance with increasing tendency in the resolution of the image. In this case, the image data are preferable to be seriated in terms of the adjacent pixels. As an image processing system where the image data are seriated there is known a multi-display system. However, this multi-display system has the problem that image joints appear between the displays.

SUMMARY OF THE INVENTION

It is therefore an object of the present invention to provide a system which is capable of adequately reproducing and displaying a jointless high-grade image and speedily processing a motion picture in real time.

In accordance with the present invention, there is provided an image processing system for an image display comprising: image data producing means for producing image data corresponding to an image to be displayed, the image data producing means dividing the image data into a plurality of data sections respectively corresponding to image areas constituting the image so that each of the plurality of data sections is produced as serial data and the plurality of data sections are outputted in parallel; and display means including a number of pixel elements continuously arranged one-dimensionally or two-dimensionally and divided into a plurality of element sections respectively corresponding to the plurality of data sections produced by the image data producing means, each of the plurality of element sections comprising a predetermined number of the pixel elements, the display means being responsive to the image data from the image data producing means so that the plurality of data sections are inputted in parallel to the plurality of element sections of the display means, whereby the display means displaying the image on a screen on the basis of the plurality of inputted data sections.

In accordance with this invention, there is also provided an image processing system for an image display comprising: image data producing means for producing image data corresponding to an image to be displayed, the image data producing means dividing the image data into a plurality of data sections respectively corresponding to image areas constituting the image so that each of the data sections is produced as serial data and the data sections are outputted in parallel; light-emitting means including a number of light-emitting elements continuously arranged one-dimenionally or two-dimensionally and divided into element sections respectively corresponding to the plurality of data sections produced by the image data producing means, each of the plurality of element sections comprising a predetermined number of the light-emitting elements, the light-emitting means being responsive to the image data from the image data producing means so that the plurality of data sections are respectively inputted in parallel to the plurality of element sections, whereby the element sections respectively emit information light corresponding to the plurality of inputted data sections; spatial light modulator means responsive to the information light from the light-emitting means to write information data corresponding to the plurality of data sections produced by the image data producing means; and display means for reading the information data written in the spatial light modulator means so as to display the image on a screen on the basis of the read information data.

According to this invention, there is further provided an image processing system for reproduction of an image of a movie film, comprising: image data producing means for producing image data corresponding to an image to be displayed, the image data producing means including a number of photoelectric elements continuously arranged one-dimensionally or two-dimensionally and divided into a plurality of element sections respectively corresponding to a plurality of image areas constituting the image so as to divide the image data into a plurality of data sections so that each of the plurality of data sections is produced as serial data and the plurality of data sections are outputted in parallel; and processing means responsive to the plurality of data sections produced by the image producing means so as to independently process the plurality of data sections to reproduce the image at every data section.

Moreover, according to this invention, there is provided an image processing system for recording of an image, comprising: image data producing means for producing image data corresponding to an image to be displayed, the image data producing means dividing the image data into a plurality of data sections respectively corresponding to image areas constituting the image so that each of the plurality of data sections is produced as serial data and the plurality of data sections are outputted in parallel; compressing means coupled to the image data producing means for compressing the image data at every data section and outputting the compressed image data in parallel between the plurality of data sections; parallel-to-serial converting means coupled to the compressing means for converting the compressed image data into a serial form; and recording means coupled to the parallel-to-serial converting means for recording the serial compressed image data on a recording medium.

BRIEF DESCRIPTION OF THE DRAWINGS

The object and features of the present invention will become more readily apparent from the following detailed description of the preferred embodiments taken in conjunction with the accompanying drawings in which:

FIGS. 10 to 12 are illustrations for describing conventional systems.

DETAILED DESCRIPTION OF THE INVENTION

Figure 1:
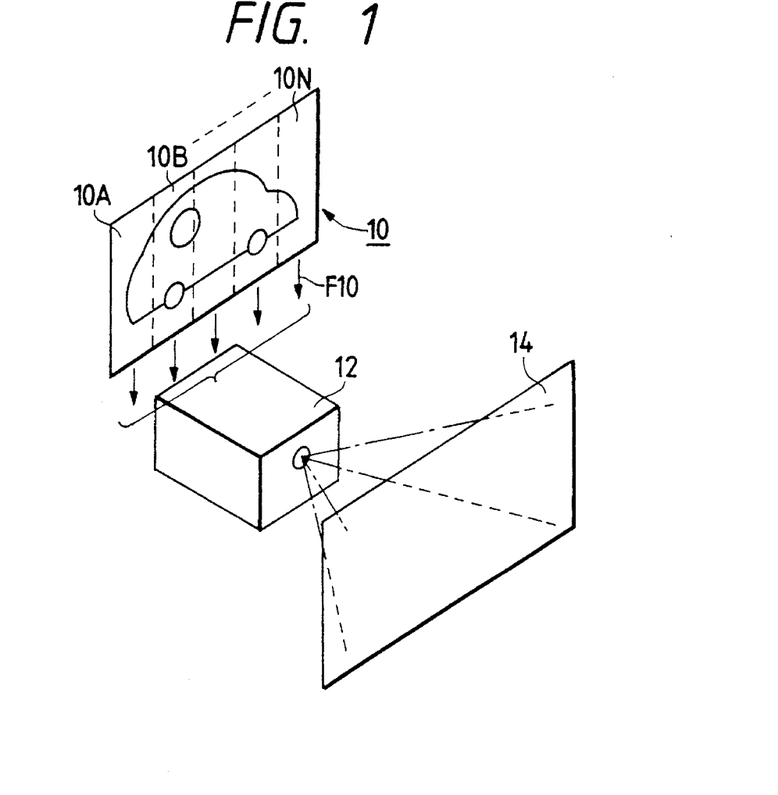
FIG. 1 is an illustration for describing a basic function of an image processing system according to the present invention.

Referring now to FIG. 1 there is illustrated an image processing system according to the present invention which is arranged so as to read and process a high-grade picture. In FIG. 1, a high-grade picture such as a motion film 10 is virtually divided into a number of elongated areas 10A to 10N, and an image processing system 12 reads the image data in serial in terms of each of the areas and in parallel between the different areas as indicated by arrows F10. For example, the reading device of the processing system 12 is constructed with photoelectric conversion cells successively arranged in correspondence with pixels and divided in correspondence with the divided areas 10A to 10N. For instance, the image data read are compression-processed so as to reduce the information amount to allow the serial conversion recording. At the time of the reproduction, the image data compressed are expanded and then displayed on a screen 14 through a display device of the processing system 12. For example, the display device is constructed with light-emitting cells successively arranged in correspondence with pixels and divided in correspondence with the divided areas 10A to 10N. This arrangement permits reproduces and displays the image without having joints. In addition, since the image is divided into N areas, the image data processing time principally becomes 1/N to thereby allow the processing of the high-grade picture data in real time.

Figure 2:
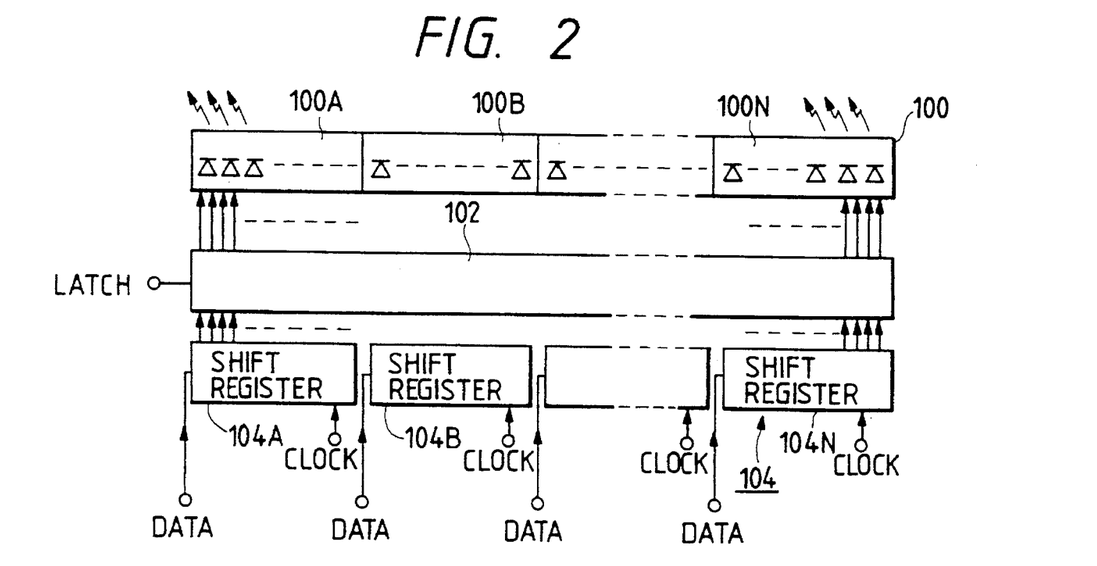
FIG. 2 is an illustration for describing a display system according to a first embodiment of the present invention.

A description will be made hereinbelow with reference to FIG. 2 in terms of a display device according to a first embodiment of this invention. In FIG. 2, designated at numeral 100 is an LED array comprising LEDs (light-emitting diodes) successively arranged in correspondence with pixels of a screen linearly and continuously existing in the horizontal directions of the screen so that the number of the LEDs is equal to the number of the pixels of the screen. The input side of the LED array 100 is coupled through a latch circuit 102 to a shift register assembly 104 comprising a number of shift registers 104A to 104N. The LED array 100 is virtually divided into a plurality of areas 100A to 100N which are coupled through the latch circuit 102 to the corresponding shift registers 104A to 104N, respectively.

In operation, for instance, the image data for the area 100A of the LED array 100 are successively supplied in serial from an external device (not shown) to the shift register 104A. That is, the image data for each area of the LED array 100 are supplied to each shift register as serial data. On the other hand, the image data of the respective areas 10A to 10N of the picture 10 illustrated in FIG. 1 are supplied in parallel to the corresponding shift registers 104A to 104N of the shift register assembly 104 so that the shift registers 104A to 104N respectively transfer the inputted data in parallel through the latch circuit 102 to the corresponding areas 100A to 100N of the LED array 100. These transferred image data are latched in the latch circuit 102 when the data reach an amount corresponding to one line, whereby the LEDs in the areas 100A to 100N of the LED array 100 respectively emit the light in accordance with the transferred image data. This operation is repeatedly performed at every scanning of the LED array 100. Here, since the image data are transferred in parallel to between the areas 100A to 100N of the LED array 100, the transfer to the LED array 10 can be effected at a high speed. In addition, since the LEDs are arranged linearly and continuously, the image to be reproduced results in a high-grade picture not having joints irrespective of the image data transferred in parallel.

Figure 3:
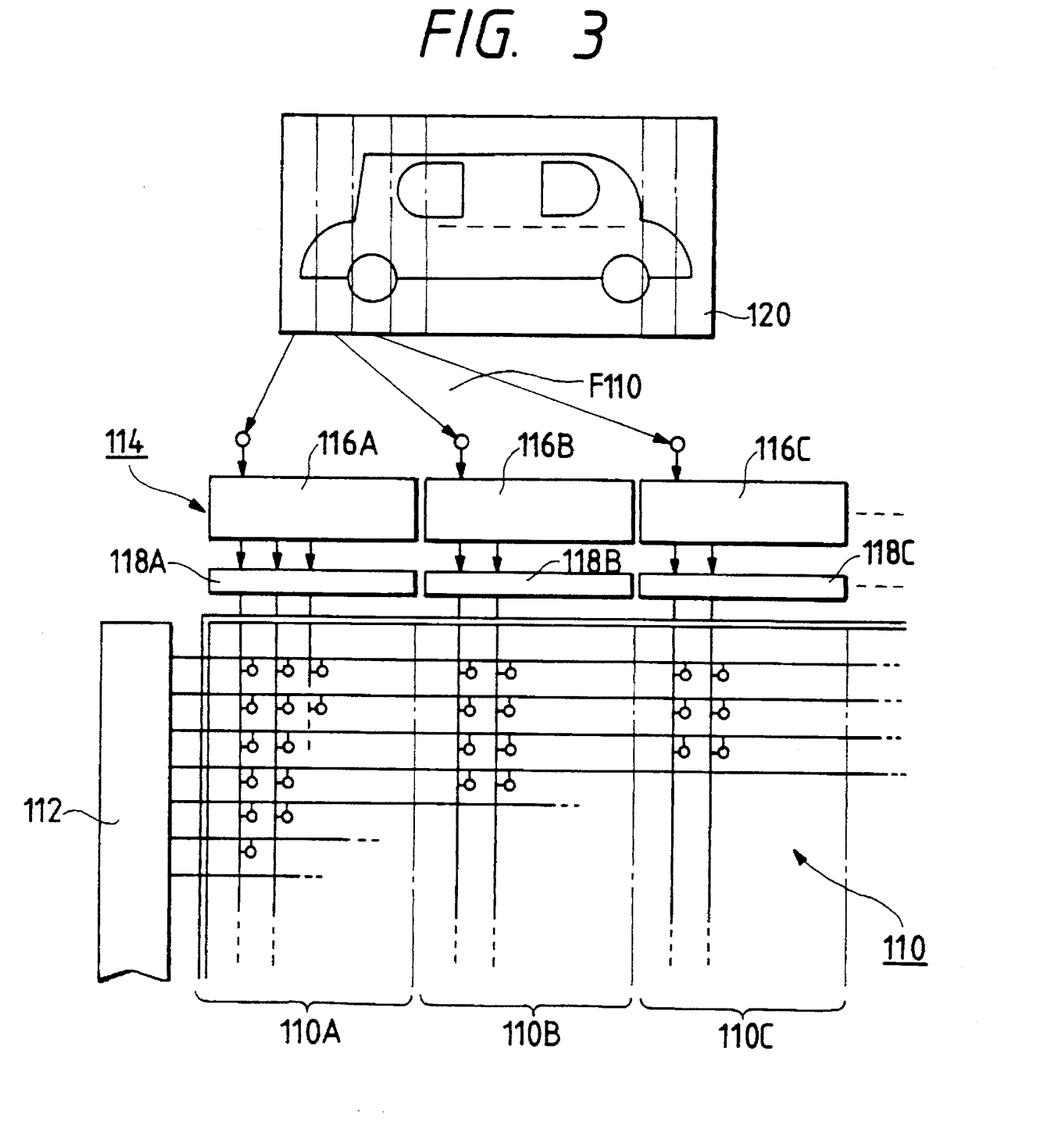
FIG. 3 is an illustration for describing a display system according to a second embodiment of the present invention.

Secondly, a description will be made hereinbelow with reference to FIG. 3 in terms of a second embodiment of this invention. FIG. 3 shows a display device based on a liquid crystal panel display. In FIG. 3, with respect to a liquid crystal panel 110 including a number of cells arranged two-dimensionally, there are disposed a vertical scanning control circuit 112 and a horizontal scanning control circuit 114. The vertical and horizontal scanning control circuits 112 and 114 are arranged so as to successively drive the number of cells of the liquid crystal panel 110. The liquid crystal panel 110 is virtually divided in the horizontal scanning directions into a plurality of areas including 110A, 110B and 110C as illustrated in FIG. 3, and the horizontal scanning control circuit comprises a plurality of transfer registers 116A, 116B, 116C which respectively correspond to the areas 110A, 110B, 110C of the liquid crystal panel 110 and gates 118A, 118B, 118C provided in connection with the plurality of transfer registers 116A, 116B and 116C.

In operation, a high-grade picture 120 to be reproduced is virtually divided into a plurality of areas in correspondence with the areas 110A, 110B and 110C of the liquid crystal panel 110. The image data of the respective areas of the picture 120 are respectively supplied to the corresponding transfer registers 116A to 116C of the horizontal scanning control circuit 114 as indicated by arrows F110. Here, the image data of each of the areas of the picture 120 are supplied as serial data to the corresponding transfer register of the horizontal scanning control circuit 114, while the image data are inputted as parallel data between the areas of the picture 120 to the corresponding transfer registers 116A to 116C, respectively. The respective image data are outputted through the gates 118A to 118C to the cells existing on a horizontal line of the liquid crystal panel 110 designated by the vertical scanning control circuit 112. According to this embodiment, since the cells themselves of the liquid crystal panel 110 are arranged two-dimensionally and continuously, it is possible to display a jointless image at a high speed as well as the above-described first embodiment.

Figure 4:
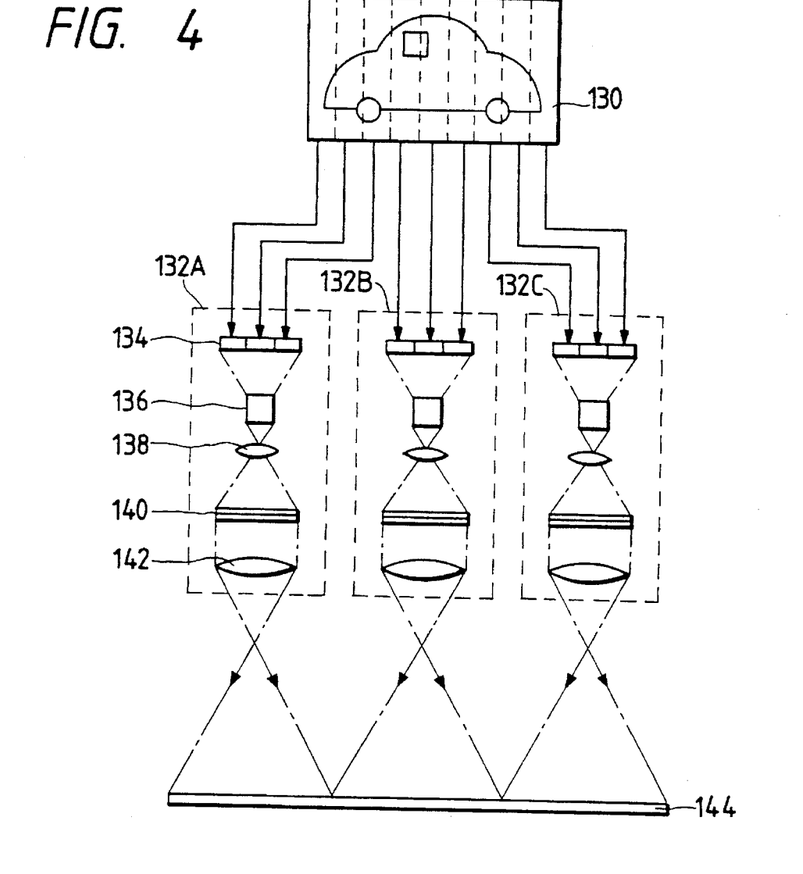
FIG. 4 is an illustration for describing a display system according to a third embodiment of this invention.

Further, a description will be made hereinbelow with reference to FIG. 4 in terms of a third embodiment of this invention. FIG. 4 is an illustration of a display device comprising a number of spatial light modulators. In FIG. 4, a high-grade picture 130 to be displayed is virtually divided into a plurality of areas, for example, 9 areas which are in turn classified into groups (three groups) each including successively adjacent three areas. The image data of the three groups are supplied to three conversion projecting sections 132A, 132B and 132C of an image processing system, respectively. Each of the three conversion projecting sections 132A to 132C comprises an LED array 134 divided into three portions, a deflecting device 136, a first projecting lens 138, a spatial light modulator and a second projecting lens 142, which are disposed in order from the high-grade picture 130 side to a screen 144 side.

In operation, the image data of the three areas of each group of the high-grade picture 130 are respectively supplied in parallel to the three divided portions of the LED array 134 of each of the conversion projecting sections 132A to 132C, for example, in the same manner as the first embodiment. The LED array 134 of each of the conversion projecting sections 132A to 132C emits light beams in accordance with the image data of the three areas of each group of the high-grade picture 130. These lights emitted from the LED array 134 are deflected by the deflecting device 136 so as to be incident through the first projecting lens 138 onto the spatial light modulator 140, thereby writing an image corresponding to the three areas of the picture 130. The written image is read out from the spatial light modulator 140 through reading light, not shown, and then projected through the second projecting lens 142 on the screen 144. This embodiment can provide the effect similar to that of the above-described embodiments. Here, although in the third embodiment one spatial light modulator 140 is provided with respect to three areas of the picture 130, it is appropriate to provide one spatial light modulator with respect to each area of the picture 130.

Figure 5A:
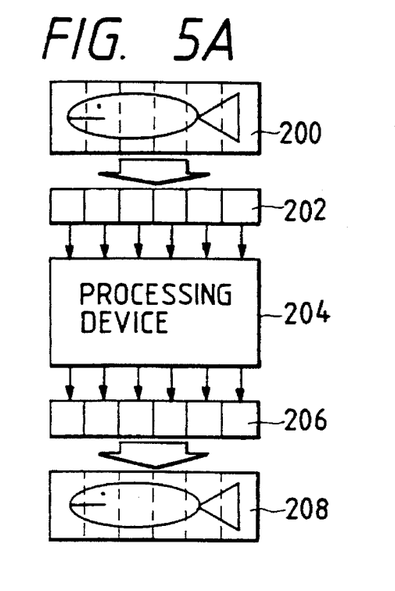
FIG. 5A is an illustration for describing a movie system according to a fourth embodiment of this invention.

Further, a fourth embodiment of this invention will be described hereinbelow with reference to FIGS. 5A, 6A, 6B and 7. This embodiment relates to a movie system. In FIG. 5A, a movie film 200 is divided virtually into a plurality of areas, and the image data of the divided areas of the movie film 200 are outputted in parallel through a conversion device 202. On the other hand, the image data corresponding to each of the divided areas of the movie film 200 are processed as serial data. The output side of the conversion device 202 is coupled to the input side of a processing device 204, the output side of the processing device 204 being coupled to the input side of a reproduction device 206.

Figure 6A:
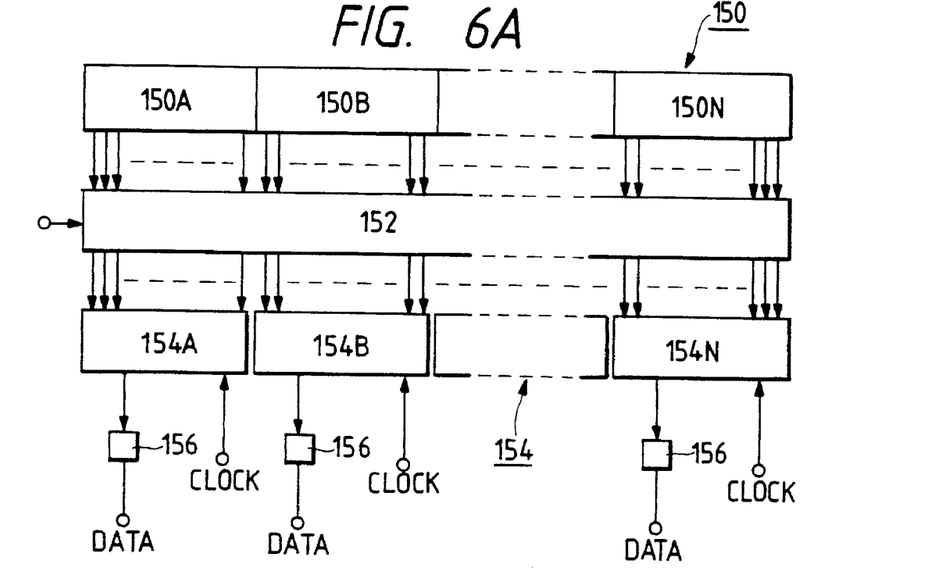
FIGS. 6A and 6B are illustrations of conversion devices to be used in the FIG. 5A movie system.

FIG. 6A illustrates one example of the conversion device 202 illustrated in FIG. 5A. In FIG. 6A, designated at numeral 150 is a photoelectric conversion section (for example, a line sensor) comprising a number of photodiodes linearly and continuously arranged and virtually divided into a plurality of areas 150A to 150N. The output side of the photoelectrically conversion section 150 is coupled through a transfer gate section 152 to the input side of a charge transferring register assembly 154. The charge transferring register assembly 154 comprises a plurality of registers 154A to 154N disposed in correspondence with the areas 150A to 150N of the photoelectric conversion section 150, respectively. The plurality of registers 154A to 154N are at their output sides connected to a plurality of charge detection sections 156, respectively.

Figure 6B:
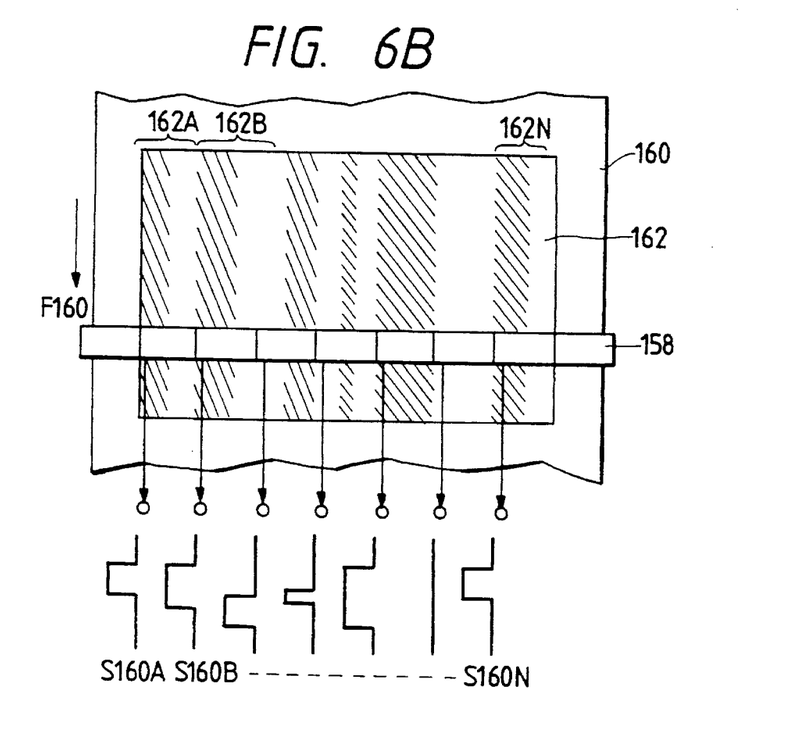

Operation of the conversion device 202 will be described hereinbelow with reference to FIG. 6B where numeral 158 represents a line sensor (the conversion device 202), numeral 160 denotes a high-resolution film (the movie film 200 in FIG. 5A) and numeral 162 designates a high-grade picture on the high-resolution film 160. As illustrated in FIG. 6B, the picture 162 is virtually divided into areas 162A to 162N in correspondence with the areas 150A to 150N of the photoelectric conversion section 150. First, the line sensor 158 is relatively moved in a secondary scanning direction F160 with respect to the high-resolution film 160, whereby the high-grade picture 162 on the high-resolution film 160 is photoelectrically converted into image information data at every area (each of the areas 162A to 162N) corresponding to each of the areas 150A to 150N of the photoelectric conversion section 150. The image data of the areas 162A to 162N of the picture 162 are respectively supplied from the photoelectric conversion section 150 through the transfer gate 152 to the charge transferring register assembly 154 so as to be shifted in the corresponding registers 154A to 154N of the charge transferring register assembly 154 in accordance with shift clock signals, thereafter outputted through the charge detecting sections 156. That is, as illustrated in FIG. 6B, the image data S160A to S160N can be outputted from the line sensor 158 so as to be serial in each area and parallel between the areas.

Assuming that that the photoelectric conversion section includes photodiodes corresponding to 4096 pixels and the shift clock frequency is 40 MHz, in the case of reading data with one-system shift register as well as the conventional system, the reading time becomes 102 μs per line. In addition, if one screen is 2304 lines, the number of the pixels in one screen becomes 4096×2304, thereby requiring the reading time of 235 ms per frame. This means that the conventional system cannot read out a motion picture in real time. On the other hand, according to this embodiment, for example, the photoelectric conversion section 150 is divided into areas each including 256 dots and the picture is read out with 16 registers. Thus, the reading time becomes 14.7 ms per frame so that a 60-Hz motion picture can be read out in real time. That is, although the image data reading speed is increased with the division of the picture into a plurality of areas, since the photodiodes of the photoelectric conversion are continuously arranged, it is possible to reproduce a jointless image.

Figure 7:
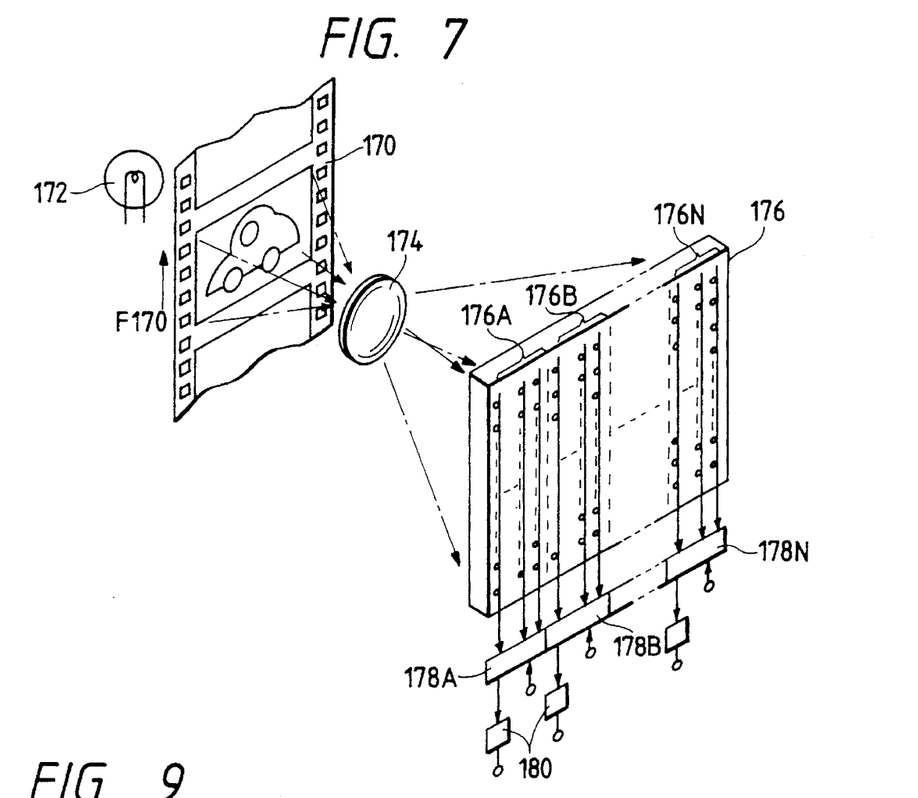
FIG. 7 shows a modification of the conversion device of the FIG. 5A movie system.

Here, the conversion device 202 in FIG. 5A can also be arranged as illustrated in FIG. 7. That is, in FIG. 7, with a film 170 being shifted in a direction indicated by an arrow F170, due to light emitted from a light source 172 a high-grade picture is projected through a projecting lens 174 onto an area sensor 176 so as to be photoelectrically converted. The area sensor 176 is virtually divided into a plurality of areas 176A to 176N, whereby the image data of the plurality of areas 176A to 176N are outputted in parallel through charge transferring registers 178A to 178N and charge detecting sections 180 which are provided in correspondence with the plurality of areas 176A to 176N. Here, similarly, the image data of each area are outputted as serial data.

Returning back to FIG. 5A, the reproduction section 206 can be constructed as described in the above-described embodiments, and the the description thereof will be omitted for brevity. In operation of this fourth embodiment, the image data corresponding to the movie film 200 are outputted from the conversion device 202 so as to be serial data in terms of each area and parallel data as a whole as described above. The processing device 204 performs necessary processes such as gamma correction with respect to the image data outputted from the conversion device 202 and outputs the processed image data in parallel at every area to the reproduction device 206. The reproduction device 206 performs the reproduction process at every area with respect to the image data from the processing device 204, thereby displaying the high-grade picture on the screen 208. This embodiment can similarly process a high-grade picture such as a motion picture in real time.

Figure 5B:
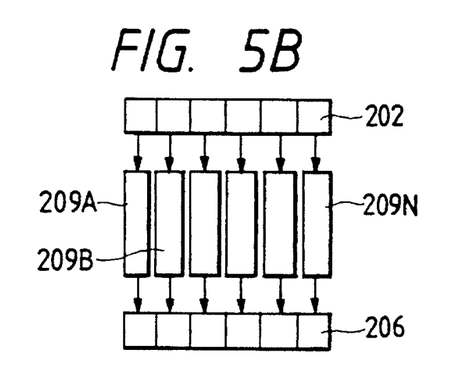
FIG. 5B is an illustration for describing a movie system according to a fifth embodiment of this invention.

FIG. 5B shows a fifth embodiment of this invention which is a modification of the above-described fourth embodiment, where parts corresponding to those in FIG. 5A are marked with the same numerals. In FIG. 5B, to the output side of a conversion device 202, there are coupled a plurality of image processing sections 209A to 209N which respectively correspond to the areas of a movie film 200. The output sides of the image processing sections 209A to 209N are respectively connected to a reproduction device 206. In this embodiment, the image processing is effected at every area, thus allowing use of a general VTR (video tape recorder).

Figure 8A:
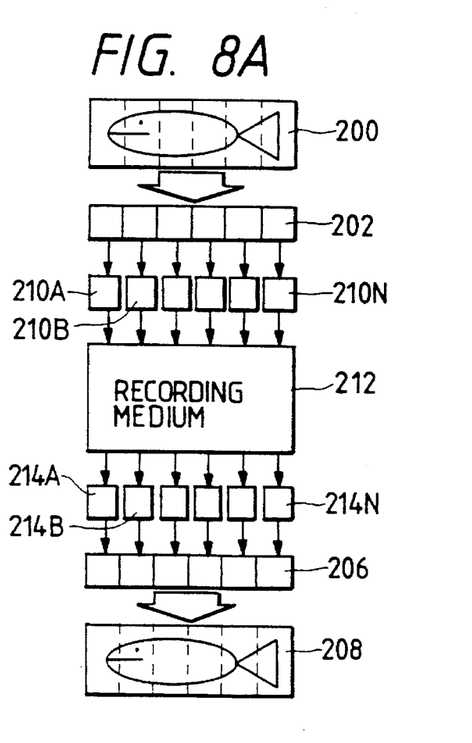
FIG. 8A is an illustration for describing a data recording and reproducing system according to a sixth embodiment of this invention.

Further, a description will be made hereinbelow with reference to FIG. 8A in terms of a sixth embodiment of this invention. In FIG. 8A, parts corresponding to those in FIG. 5A showing the above-described fourth embodiment are indicated with the same marks. To the output sides of a conversion device 202 for producing image data at every area of a movie film 200, there are coupled a plurality of data compressors 210A to 210N which are responsive to the corresponding area image data from the conversion device 202. The outputs of the data compressors 210A to 210N are supplied to a recording medium 212 which is for recording and transmitting the image data. The output data of the recording medium 212 which correspond to the respective areas are separately supplied to data expandors 214A to 214N whose output sides are coupled to a reproduction device 206. That is, according to this embodiment, the image data outputted from the conversion device 202 are compression-processed at every area in the data compressors 210A to 210N and then recorded in the medium 212. The image data read out from the recording medium 212 are expansion-processed at every area in the data expandors 214A to 214N and then supplied to the reproduction device 206.

Secondly, a description will be made hereinbelow in terms of the compression and expansion processes due to the data compressors 210A to 210N and the data expandors 214A to 214N. For example, the conversion device 202 having elements corresponding to 4096 pixels photoelectrically converts a high-grade picture having an aspect ratio 16 (horizontal): 9 (vertical) in a horizontal direction. In the case of 60 frames per second, the serial data clock for the entire screen becomes 4096×2304×60=566 MHz. Further, the data transfer rate of the conversion device 202 is 40 MHz, and the picture 200 with 4096 pixels per horizontal line is divided into 16 areas each having 256 pixels. The conversion device 202 photoelectrically converts the picture 200 with the transfer rate of 40 MHz into image data which are parallel between the respective areas of the picture 200. The parallel image data from the conversion device 202 are compressed at every area in the data compressors 210A to 210N and then recorded in the recording medium 212. Here, when a digital VTR is used as the recording medium 212 and the frequency of the clock in the recording is 18.6 MHz, the compression ratio becomes 1/30 (the expansion is the reverse). It is also appropriate to use a digital VTR or the like which can record and transmit the parallel data as it is. For example, when the number of the pixels 7040 in the horizontal directions and 3960 in the vertical directions in the case of 60 frames per second, the data clock becomes 7040×3960×60=1672 MHz. Further, let it be assumed that 16-channel image data are recorded in parallel to a digital VTR whose data clock per channel is 20 MHz. When the number of the areas is 16, the number of the pixels in each area becomes 4096/16=256, and the data clock becomes 1672/16= 104.5 MHz.

That is, due to the data compression of 20/104.5, the parallel image data from the conversion device 202 divided into areas of 256 pixels are respectively recorded in parallel into a magnetic tape through a 16-channel digital VTR head. These 16-channel image data are respectively expanded after reproduced. Here, if the processing abilities of the respective channels of the digital VTR are enhanced, the compression processing for the image data is not required.

Figure 8B:
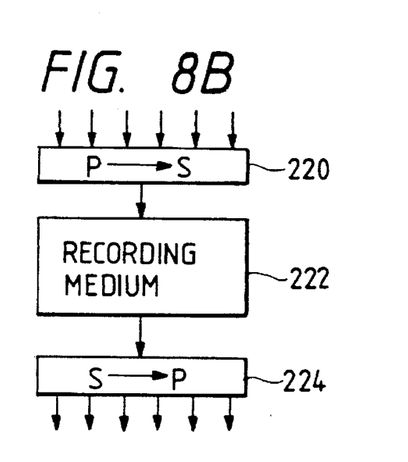
FIG. 8B is an illustration for describing a data recording and reproducing system according to a seventh embodiment of this invention.

Still further, a seventh embodiment of this invention will be described hereinbelow with reference to FIG. 8B. In FIG. 8B, to the output sides of the data compressors 210A to 210N as illustrated in FIG. 8A, there is coupled of the input side of a P-S converting device 220 for converting parallel data into serial data, the output of the P-S converting device 220 being supplied to a recording medium 222. The image data read out from the recording medium 222 are led to an S-P converting device 224 having a conversion function from serial data into parallel data. More specifically, the S-P converting device 224 converts the parallel data from the recording medium 22 into serial data in terms of each area and into parallel data between all the areas. The output data of the S-P converting device 224 are respectively coupled to the corresponding data expandors 214A to 214N as illustrated in FIG. 8A. The other arrangement is the same as that in FIG. 8A.

According to this embodiment, since the amount of the image data is reduced by the data compressions due to the data compressors 210A to 210N, the parallel image data compressed can be processed as the serial image data in the P-S converting device 220. Thereafter, the serial image data are recorded or transmitted in the recording medium 222. In reproduction, the reverse operation is effected through the S-P converting device 224 and the data expandors 214A to 214N. For example, in the case of division-processing a digital picture where the number of pixels of the is 1000× 2000 in the horizontal and vertical directions, 8 bits are taken as one-pixel data, 60 Hz is taken for one frame and 960 Mbps are taken in serializing the data, if the image data are compressed up to 1/10 at every area, the digital picture can be recorded as serial data of 96 Mbps onto the recording medium 222 in real time.

Figure 9:
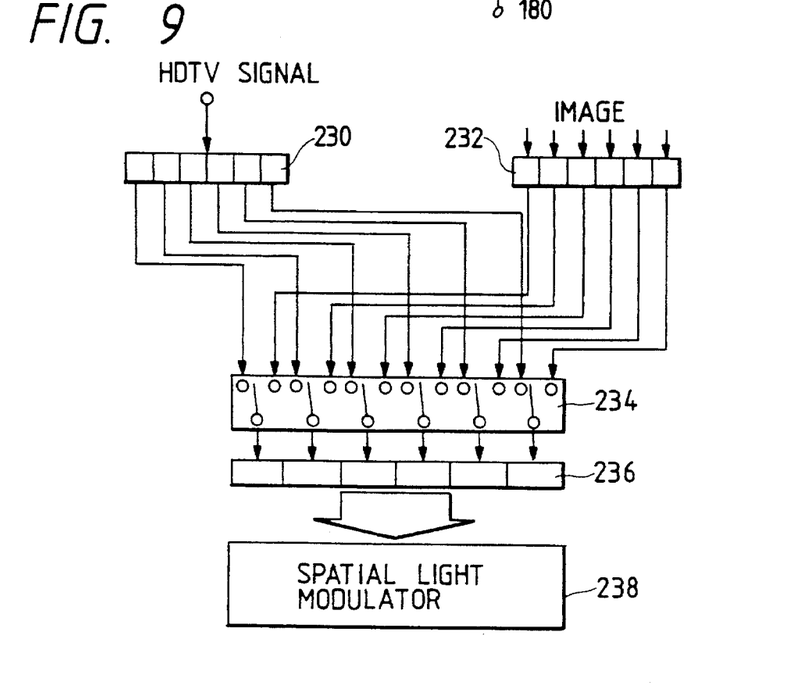
FIG. 9 is an illustration for describing a display system according to an eighth embodiment of this invention.

Moreover, a description will be made hereinbelow with reference to FIG. 9 in terms of an eighth embodiment of this invention. This eighth embodiment is for performing a switching operation between image information expressed as a single serial signal such as HDTV signal and image information where a plurality of different serial signals are outputted in parallel as described above. In FIG. 9, a HDTV signal is inputted to a S-P converting device 230 so as to be converted into serial data in each area and parallel data between the areas. On the other hand, a scanner 232 reads image data from a high-grade picture in a manner as described above. The output sides of the S-P converting device 230 and the output sides of the scanner 232 are respectively coupled to input side switching contacts of switches of a switching device 234, which switches are provided in correspondence with the picture areas. The output sides of the switches of the switching device 234 are respectively coupled to the input sides of divided areas of an LED array 236. A spatial light modulator 238 is disposed to face the light-emitting side of the LED array 236 so as to perform the photoelectric conversion of the light from the LED array 236 to reproduce the picture on a screen, not shown. This arrangement permits reproduction of both the high-grade picture based on the HDTV signal and high-grade picture such as a film.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, an image processing system according to this invention can also process other image data such as a computer graphic signal, and can also use various medium such as a disc, an spatial light modulator constructed by a polymer-liquid crystal composite film, and a charge-holding medium as the recording medium, and further can use various devices such as a CRT, a liquid crystal panel and an LED printer as the displaying device. In addition, it is appropriate that, in the case of using the line sensor, a plurality of line sensor arrays are provided with respect to the divided area so as to speed up the transfer of the image data and the image data are constructed as the serial data when outputting. Further, although in the above-described embodiments the picture is divided into a plurality of areas in vertical directions, it is appropriate to divide the picture in the horizontal directions. Moreover, the conversion device and the reproduction devices in the fourth to seventh embodiments are not limited to the devices used in the first to third embodiments. It is possible to use various types of devices as the conversion and reproduction devices. Still further, it is possible that, in the above-described third embodiment, the spatial light modulators 140 are constructed as one unit.

What is claimed is:

1. An image processing system comprising: image data producing means for producing image data corresponding to an image to be displayed, said image data producing means dividing said image data into a plurality of data sections respectively corresponding to parallel image areas constituting said image so that each of said plurality of data sections is produced as serial data and said plurality of data sections are outputted in parallel, said parallel image areas formed by dividing said image only in a horizontal direction;

compressing means coupled to said image data producing means for compressing said image data at every data section and outputting compressed image data in parallel between said plurality of data sections;

recording means for recording the compressed image data on a recording medium;

reading means for reading the compressed image data from said recording medium;

expanding means for expanding the compressed image data from said reading means at every data section and outputting expanded image data in parallel between said plurality of data sections; and display means including a number of successively arranged pixel elements which are divided only in a horizontal direction into a plurality of parallel element sections respectively corresponding to said plurality of data sections produced by said image data producing means, each of said plurality of element sections comprising a number of said pixel elements, said display means being responsive to the image data from said expanding means so that said plurality of data sections are inputted in parallel to said plurality of element sections of said display means, whereby said display means displays said image on a screen on the basis of the image data from said expanding means, wherein said display means comprises light-emitting means and said pixel elements comprise light-emitting elements so that said element sections respectively emit information light corresponding to said plurality of data sections, and wherein said display means further comprises spatial light modulator means responsive to information light from said light-emitting means to write information corresponding to said plurality of data sections, and projection means for projecting said image on the screen on the basis of said information written by said spatial light modulator means.

2. An image processing system comprising:

image data producing means for producing image data corresponding to an image to be displayed, said image data producing means dividing said image data into a plurality of data sections respectively corresponding to parallel image areas constituting said image so that each of said plurality of data sections is produced as serial data and said plurality of data sections are outputted in parallel, said parallel image areas formed by dividing said image only in a horizontal direction;

compressing means coupled to said image data producing means for compressing said image data at every data section and outputting compressed image data in parallel between said plurality of data sections;

recording means for recording the compressed image data on a recording medium;

reading means for reading the compressed image data from said recording medium;

expanding means for expanding the compressed image data from said reading means at every data section and outputting expanded image data in parallel between said plurality of data sections;

display means including a number of successively arranged pixel elements which are divided only in a horizontal direction into a plurality of parallel element sections respectively corresponding to said plurality of data sections produced by said image data producing means, each of said plurality of element sections comprising a number of said pixel elements, said display means being responsive to the image data from said expanding means so that said plurality of data sections are inputted in parallel to said plurality of element sections of said display means, whereby said display means displays said image on a screen on the basis of the image data from said expanding means, parallel-to-serial converting means coupled to said compressing means for converting the compressed image data into a serial form, said recording means recording the serial compressed image data on said recording medium, and said reading means reading the serial compressed image data from said recording medium, and further comprising serial-to-parallel converting means for converting the serial compressed image data into data sections, wherein said expanding means operates for respectively expanding said data sections from said serial-to-parallel converting means, and wherein said display means comprises light-emitting means and said pixel elements comprise light-emitting elements so that said element sections respectively emit information light corresponding to said plurality of data sections, and wherein said display means further comprises spatial light modulator means responsive to information light from said light-emitting means to write information corresponding to said plurality of data sections, and projection means for projecting said image on the screen on the basis of said information written by said spatial light modulator means.

* * * * *